United States Patent [19]

Johnson

[11] E Re. 28,834

[45] Reissued June 1, 1976

[54] FLOOR CONSTRUCTION FOR AN ANIMAL ENCLOSURE AND METHOD OF MAKING SAME

[75] Inventor: Robert C. Johnson, Pikeville, Ky.

[73] Assignee: Reynolds Metals Company, Richmond, Va.

[22] Filed: May 29, 1975

[21] Appl. No.: 581,910

Related U.S. Patent Documents

Reissue of:

[64] Patent No.: 3,528,391
Issued: Sept. 15, 1970
Appl. No.: 760,557
Filed: Sept. 18, 1968

[52] U.S. Cl. ..... 119/28; 52/377; 119/20; 256/13.1; 238/8

[51] Int. Cl.[2] ..... A01J 1/00

[58] Field of Search ..... 119/28, 16, 20; 238/8; 52/588, 364, 377, 375, 630, 668; 256/13.1, 17

[56] References Cited

UNITED STATES PATENTS

| | | | |
|---|---|---|---|
| 386,997 | 7/1888 | Logan | 119/28 |
| 1,941,967 | 1/1934 | Bell | 238/8 |
| 1,965,026 | 7/1934 | Bell | 238/8 |
| 2,814,999 | 12/1957 | Reeves | 52/588 X |
| 2,852,112 | 9/1958 | Shay | 52/377 |
| 2,938,711 | 5/1960 | Luff | 256/17 |
| 3,044,586 | 7/1962 | Cassels | 52/668 |
| 3,085,367 | 4/1963 | DeRidder et al. | 52/588 |
| 3,152,669 | 10/1964 | Johnston | 52/364 |
| 3,181,503 | 5/1965 | Tripp | 119/20 |
| 3,230,931 | 1/1966 | Taylor et al. | 119/28 |
| 3,466,832 | 9/1969 | March | 52/536 |

FOREIGN PATENTS OR APPLICATIONS

| | | | |
|---|---|---|---|
| 263,622 | 6/1965 | Australia | 238/8 |
| 747,177 | 3/1933 | France | 119/28 |
| 560,461 | 4/1944 | United Kingdom | 238/8 |

*Primary Examiner*—Aldrich F. Medbery
*Attorney, Agent, or Firm*—Glenn, Palmer, Lyne & Gibbs

[57] ABSTRACT

A lightweight floor construction for an animal enclosure defined by a plurality of channel members arranged in parallel spaced relation and fastened together by associated connector clips which engage the channel members solely at their lower ends. The channel members are then supported on an associated supporting structure.

26 Claims, 17 Drawing Figures

FIG-1
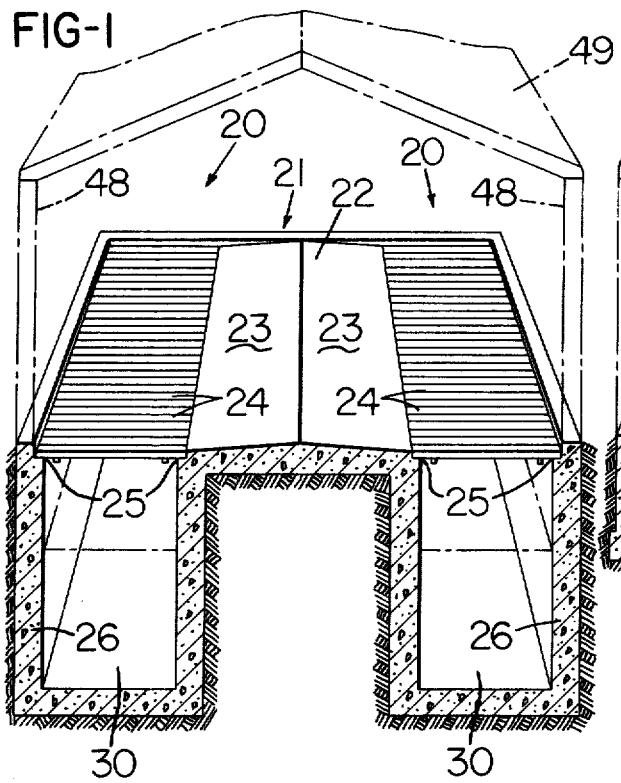
FIG-2
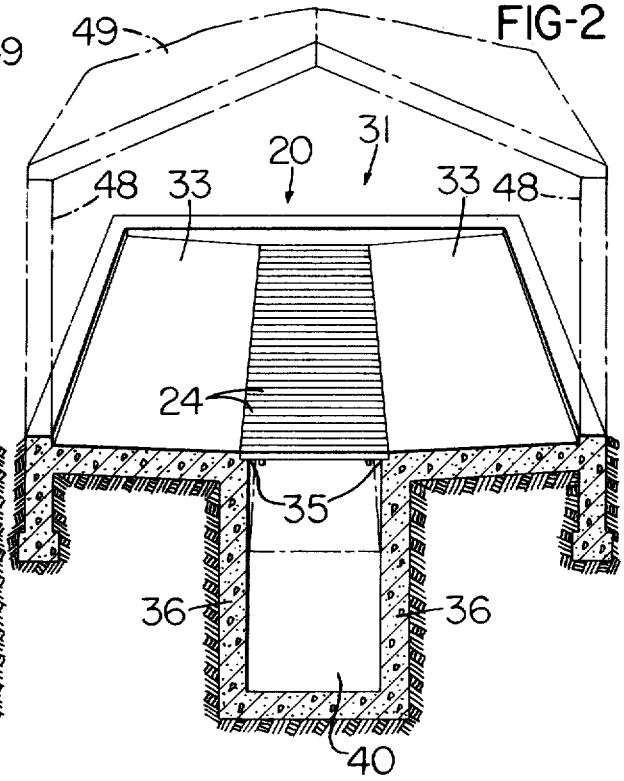
FIG-3
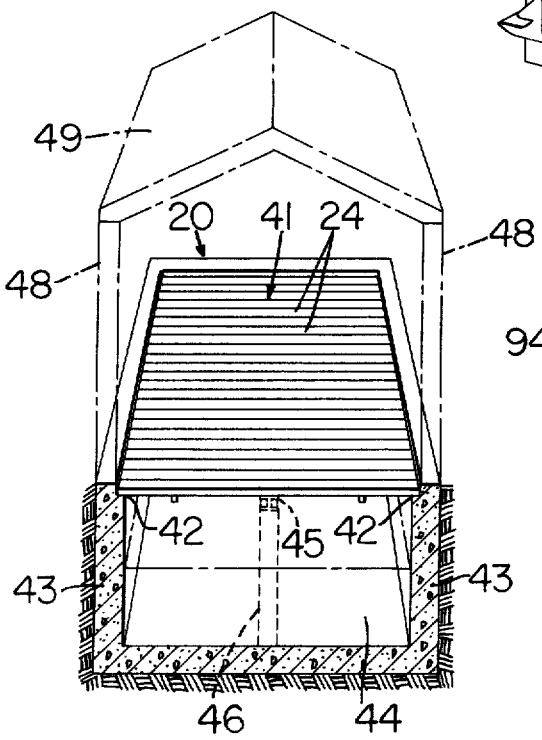
FIG-9
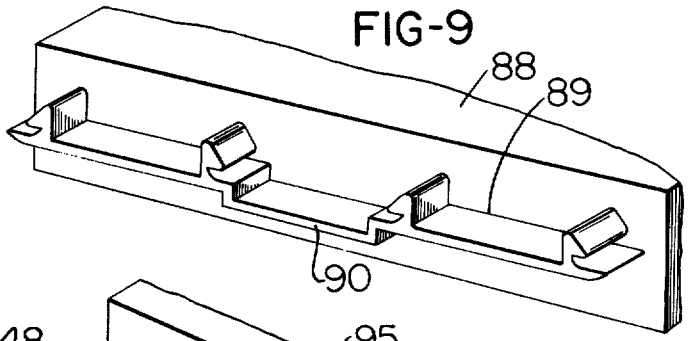
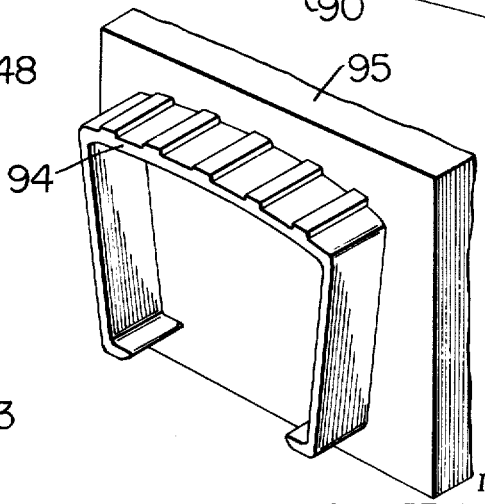
FIG-10
INVENTOR.
ROBERT C. JOHNSON
BY Glenn, Palmer & Lyne
HIS ATTORNEYS INVENTOR.
ROBERT C. JOHNSON
BY Glenn, Palmer & Lyne
HIS ATTORNEYS INVENTOR.
ROBERT C. JOHNSON
BY Glenn, Palmer & Lyne
HIS ATTORNEYS

INVENTOR.
ROBERT C. JOHNSON

BY Glenn, Palmer & Lyne

HIS ATTORNEYS

FLOOR CONSTRUCTION FOR AN ANIMAL ENCLOSURE AND METHOD OF MAKING SAME

Matter enclosed in heavy brackets [ ] appears in the original patent but forms no part of this reissue specification; matter printed in italics indicates the additions made by reissue.

BACKGROUND OF THE INVENTION

Numerous slotted or perforated floor constructions have been proposed heretofore for use in providing animal enclosures. However, previously proposed floor constructions are generally expensive, have comparatively short lives, and are difficult to maintain. In addition, many of such previously proposed floor constructions are made of very heavy elongated blocks of concrete, or similar materials, requiring expensive installation equipment and several men to install such blocks in position thereby making the total cost of such floor constructions prohibitive.

SUMMARY

This invention provides an improved floor construction for an animal enclosure and method of making same which is simple and economical. Further, this invention provides a lightweight construction which is easily installed and maintained by one person and is capable of providing trouble-free service for extended periods of time generally of the order of 10 years or longer.

Other details, uses, and advantages of this invention will become apparent as the following description of the embodiments thereof presented in the accompanying drawings proceeds.

BRIEF DESCRIPTION OF THE DRAWINGS

The accompanying drawings show present exemplary embodiments of this invention, in which:

FIG. 1 is a perspective view particularly illustrating the floor construction of this invention defining side gutters for a comparatively large floor area;

FIG. 2 is a perspective view illustrating the floor construction of this invention utilized in the center of an overall floor which has side portions sloping downwardly theretoward;

FIG. 3 is a perspective view illustrating the floor construction of this invention in an application defining the entire floor of a building enclosure;

FIG. 9 is a fragmentary perspective view illustrating the manner of extruding an elongated member used to form connector clips;

FIG. 10 is a fragmentary perspective view illustrating the manner of extruding an elongated channel member used to define channel members comprising the floor construction of this invention;

DESCRIPTION OF ILLUSTRATED EMBODIMENTS

Figure 4:
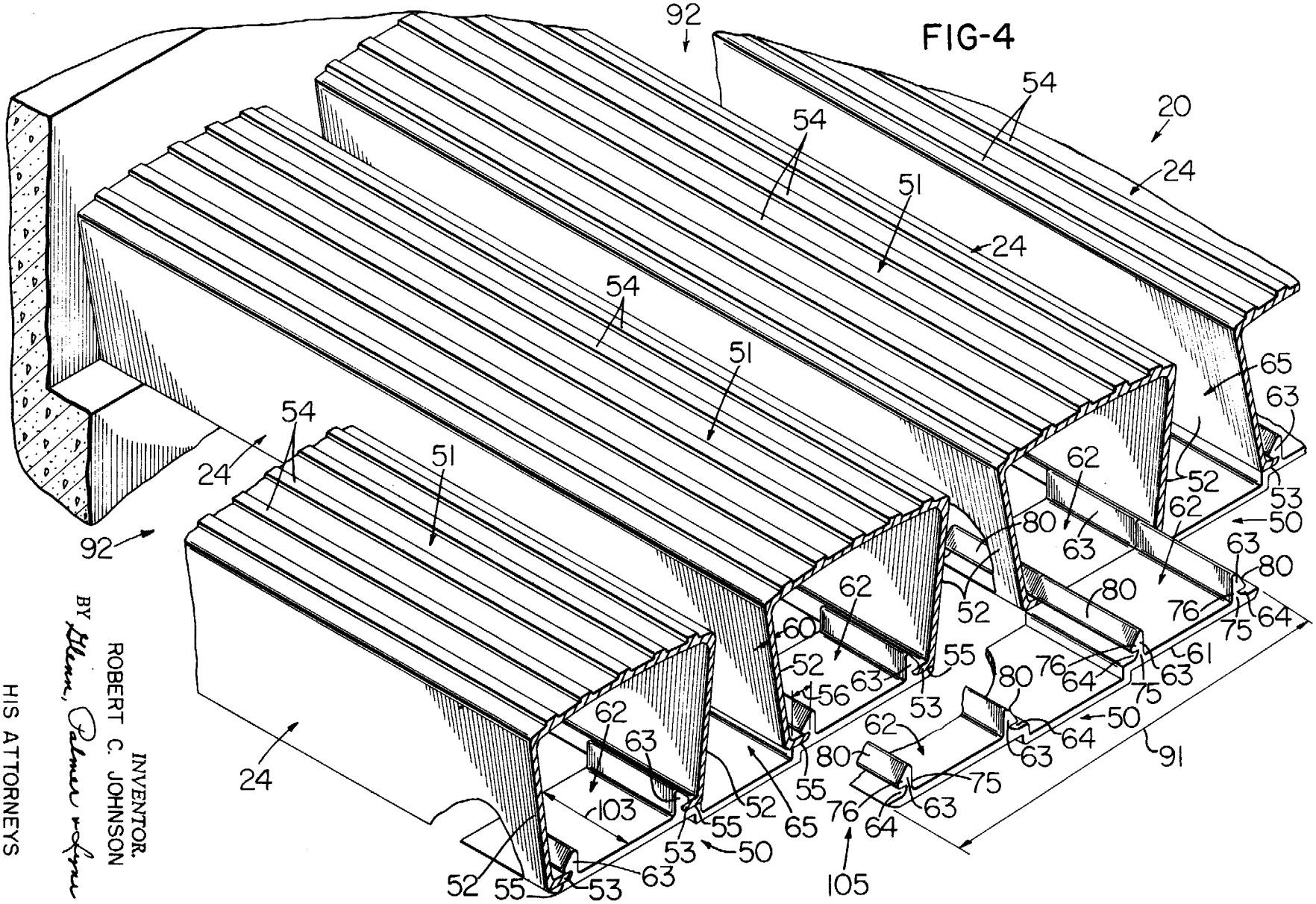
FIG. 4 is a perspective view with parts in section and parts broken away illustrating a plurality of inverted substantially U-shaped channel members comprising the floor construction of this invention held together by a plurality of associated connector clips.

Reference is now made to FIGS. 1–3 of the drawings wherein the floor construction of this invention, designated generally by the reference numeral 20, is illustrated in three exemplary applications. In particular, it will be seen in FIG. 1 that the floor construction 20 defines a pair of opposite side portions or gutters arranged on opposite sides of a comparatively large floor area designated generally by the reference numeral 21. The floor area 21 has a central portion 22 provided with a pair of inclined surface portions 23 each inclining toward an associated floor construction 20. The floor construction 20 of this invention is comprised of a plurality of inverted substantially U-shaped channel members 24 which are arranged and supported in parallel spaced relation and in a manner as will be described in detail subsequently in this specification.

The floor construction 20 illustrated in FIG. 1 has the opposite ends of its channel members 24 supported by ledges 25 defining the upper portion of supporting walls 26 and it will be seen that the floor construction 20 in each instance is supported in position over a pit 30 provided beneath the animal enclosure. Each pit 30 is adapted to receive animal wastes which drop through spaces provided between adjacent channel members 24. It should be noted that the provision of the sloping portions 23 in the central portion 22 of the overall floor 21 for the animal enclosure enables the entire floor 21 to be readily flushed with water whereupon the water and wastes drop through the floor construction 20 and into the pits 30 where they may be subsequently flushed away with water from beneath the animal enclosure. It will also be appreciated that each pit 30 may be in the form of or contain a tank which is pumped to empty the accumulation therein.

In the exemplary application of this invention illustrated in FIG. 2 of the drawings the floor construction 20 is shown as comprising the central portion of an overall floor 31 and the overall floor 31 has a pair of inclined portions 33. Each inclined portion 33 slopes from an associated side of the overall floor 31 and downwardly toward the floor construction 20 arranged in the center of the overall floor 31.

The channel members 24 comprising the floor construction 20 illustrated in FIG. 2 of the drawings have their opposite ends supported on ledges 35 and each ledge 35 is defined by providing a cutout in the top portion of an associated vertical wall 36. Each wall 36 comprises a side wall for an associated pit 40. Thus, in a similar manner as described in connection with the presentation of FIG. 1, animal wastes, litter, and the like are flushed through the floor construction 20 in the center portion of the floor 31 and drop into the pit 40 whereupon any accumulation in the pit 40 is also removed in any suitable manner.

In the exemplary application of this invention illustrated in FIG. 3 of the drawings the floor contruction 20 defines the entire floor indicated at 41. The channel members 24 illustrated in the exemplary application of FIG. 3 are shown as comparatively long members and each member 24 has each of its ends supported on an associated supporting ledge 42 provided on a vertical wall 43 comprising a vertical side wall of a pit 44 which extends beneath the entire floor 41. In this application animal wastes, litter, and the like drop through the passages provided between immediately adjacent channel members 24 and into the pit or sewerage lagoon 44 and may be removed in a similar manner as previously mentioned.

Although in the exemplary application of this invention illustrated in FIG. 3 the members 24 are shown as extending completely across the pit 44 and defining the complete width of the overall floor 41 it will be appreciated that it may be desired in defining complete floor constructions made of members 24 to provide one or more vertical supports between opposite ends of the members 24. For example, a central beams 45 may be provided and supported by suitable supporting posts 46 along the length thereof. In as much as members 45 and 46 are presented as optional members they have been drawn using dotted lines.

The floor construction 20 of this invention will be described in detail in connection with the raising of swine in confinement; however, it will be appreciated that the unique floor construction and simple method of providing and installing such floor construction is fully applicable to raising all types of livestock in confinement as well as providing floor constructions similar to floor constructions 20 for special uses such as to support feeding bunks for cattle, as floor constructions for premilking holding pens, and in milking parlors. Also, the floor construction is fully applicable to raising chickens, turkeys, and other fowl in addition to raising quadrupeds.

It will also be appreciated that suitable side walls and roof constructions may be provided over the floors 21, 31, and 41 illustrated in FIGS. 1, 2, and 3 respectively. For ease of presentation the vertical side walls and roof constructions have been designated generally by the reference numerals 48 and 49 respectively in each instance in FIGS. 1 through 3.

Having presented in general terms the manner in which the floor construction 20 of this invention may be utilized to define several exemplary types of floors, the description will now proceed with a detailed description of the floor construction 20 and the simple manner in which such floor construction may be defined and for this presentation particular reference is now made to FIG. 4 of the drawings.

As previously mentioned, the floor construction 20 comprises a plurality of inverted substantially U-shaped channel members 24 which are arranged in parallel spaced relation and suitably held together by a plurality of connector clips each designated by the general reference numeral 50. Each channel member 24 has a bight 51 defining a load-carrying surface and a pair of downwardly extending side walls 52 each terminating in an inwardly directed fastening flange 53. Each channel member 24 has a plurality of integral projections 54 extending upwardly from the top of its load-carrying surface 51 the projections 54 are provided to asssure that animals may be easily supported on the load-carrying surface 51 in a non-skidding manner.

Each fastening flange 53 extends inwardly from its associated side wall 52 in the manner illustrated in the drawings and has a substantially planar bearing surface 55 defining its lowermost surface and the bearing surface 55 is arranged roughly parallel to the load-carrying surface 51. Each bearing surface 55 has a width indicated at 56 which is comparatively large when compared to the thickness, indicated at 60, of the material comprising the channel member 24 and the width 56 assures that each channel 24 is capable of carrying a comparatively large load.

In actual practice the width indicated at 56 for the bearing surface 55 has been found to be very effective when it is generally of the order of several times greater than the thickness indicated at 60 for the channel member 24. A width at 56 of roughly five times greater than the thickness at 60 has been successfully used.

Each connector or fastening clip 50 has a base portion 61 and pairs or sets of upwardly and outwardly extending fastening legs with each set being designated generally by the reference numeral 62. Each set 62 of fastening legs has a cooperating pair of fastening legs each designated by the reference numeral 63 and each fastening leg 63 is adapted to fasten and hold firmly in position an associated fastening flange 53.

Each leg 63 extends upwardly and outwardly to define a laterally outwardly open recess 64 which is adapted to receive an associated fastening flange 53 therewithin. Each channel member 24 has integral resilient means providing a normal resiliency therefor which enables it to be fastened in position by spreading the lower ends of its side walls 52 apart at a location immediately adjacent a set 62 of fastening legs 63 and then allowing the normal resiliency of the channel member 24 to return its side walls 52 to their initial positions whereupon the fastening flanges 53 are received in an embracing manner within an associated set of recess 64 defined by associated fastening legs 63. Each given channel is thus supported solely by the fastening flanges 53 at its lower end engaging an associated fastening clip.

The channel members 24 may be made of any suitable material; however, it has been found that channel members containing metal and in particular metal containing aluminum have been found to provide the best performance and over extended periods of time. Further, it is readily possible to spread the lower ends of the side walls 52 of a channel member 24 made of an aluminum alloy without damage thereto and the aluminum alloy selected for this purpose may be of optimum strength and such that the normal resiliency thereof results in the immediate return of the side walls 52 to their initial positions.

As seen in FIG. 4 each fastening leg 63 of a connector clip 50 is roughly L-shaped having a vertically extending leg portion 75 and a horizontally extending leg portion 76 which cooperate to define an associated previously mentioned recess 64. Each fastening leg 63 also has an inclined cam surface 80 defining the top surface of its horizontally extending leg 76 and each cam surface 80 is inclined outwardly in the same direction as an associated recess 64. The cam surfaces 80 provided on the fastening legs 63 are particularly adapted to enable easy installation of a channel member 24 against an associated connector clip 50 and in a manner as will be described in detail subsequently.

Each of the channel members 24 has its downwardly extending side walls 52 arranged in a downwardly converging manner. This arrangement defines a downwardly diverging passage 65 between each immediately adjacent pair of channel members 24. Each passage 65 enables animal wastes, litter, and the like to be easily conveyed downwardly therethrough to provide the floor construction 20 which lends itself to providing an animal enclosure of optimum cleanliness. It will also be appreciated that the downwardly diverging passages 65 enable the provision of a self-cleaning type of floor construction wherein the animals normally walking on the floor construction 20 will force wastes and the like into the passages 65 and the downward diverging configuration of such passages assures that such wastes will easily drop through the floor construction 20 into an associated pit provided therebeneath.

Figure 5:
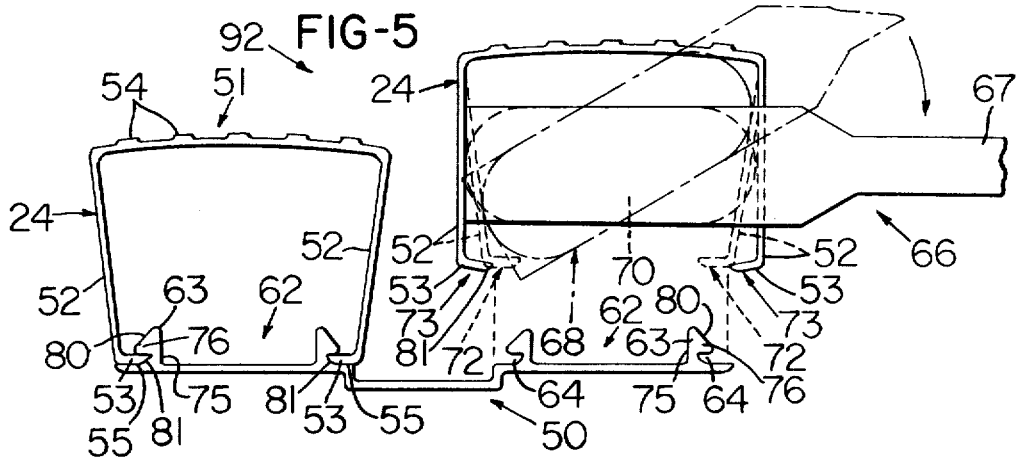
FIG. 5 is an end view of a pair of channel members and their associated connector clip which are adapted to define the floor construction of this invention and particularly illustrating the manner in which an installation tool is utilized to fasten one of the channel members in position against associated fastening legs of the connector clip.
Figure 7:
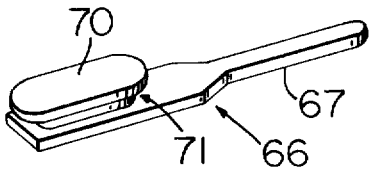
FIG. 7 is a perspective view of one exemplary embodiment of an installation tool which is utilized to install channel members in position against associated connector clips.

Having described the detailed construction of the channel members 24 and associated connector clips 50, reference is now made to FIG. 5 for a detailed presentation of one technique which may be utilized to install channel members 24 in position against an associated connector clip 50. In the illustration of FIG. 5, an installation tool 66 is used to install the members 24 in position and the tool 66 is shown in perspective view in FIG. 7. The installation tool 66 has a handle portion 67 defining one end portion thereof and a substantially elliptical head portion 70 comprising its opposite end portion. The head portion 70 may be made of any suitable material and is arranged so that it is raised above, i.e., extends outwardly of the main portion of the installation tool 66 as indicated at 71.

Figure 6:
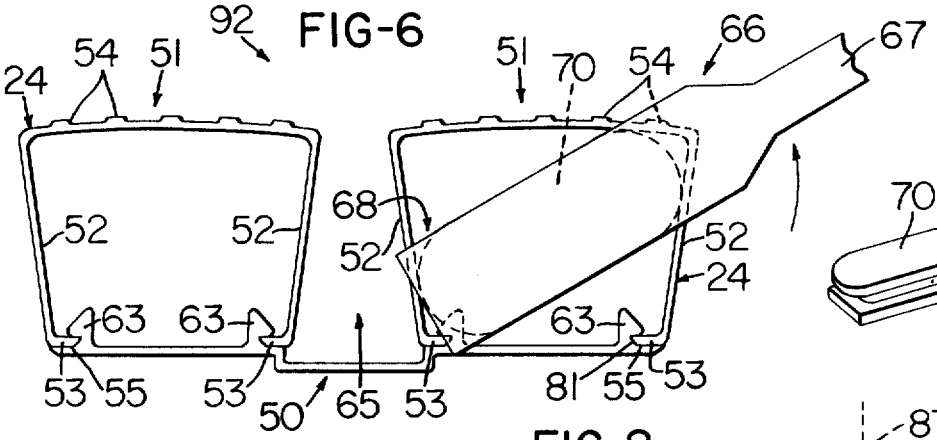
FIG. 6 is a view similar to FIG. 5 and illustrating both of the channel members installed in position and the installation tool being removed.

The elliptical head portion 70 of the installation tool 66 has a configuration which is adapted to be received within an end portion of an associated channel member 24 in the manner shown by dotted lines at 68 in FIG. 5 of the drawings and by solid lines at 68 in FIG. 6 of the drawings. To spread the side walls 52 of a member 24 apart it is a simple matter to rotate the handle portion 67 of the installation tool 66, either clockwise or counterclockwise, clockwise rotation being shown in FIG. 5, whereby the side walls 52 are spread apart and the fastening flanges 53 are also simultaneously spread apart from the dotted line position indiated at 72 in FIG. 5 to the solid line position indicated at 73.

The channel member 24 is then relatively moved toward an associated clip 50 and so that each of its fastening flanges 53 is aligned opposite an associated recess 64. The installation tool 66 is then returned to its initial position whereupon the normal resiliency of the channel member 24 causes its side walls 52 to return to their initial positions. The fastening flanges 53 are thus received within associated recesses 64 so that the channel 24 is supported solely by the fastening flanges 53 at its lower end engaging the connector clip 50. Also, it will be seen that the installation tool 66 is used to spread apart the sides walls 52 of an associated channel 24 at a location preferably immediately adjacent a set of fastening legs against which the channel member 24 is to be fastened.

As previously explained each of the fastening legs 63 comprising a set 62 of fastening legs is roughly L-shaped having a vertically extending leg portion 75 and a horizontally extending leg portion 76 which cooperate to define an associated recess 64; and, the horizontal leg portion 76 has an inclined cam surface 80 defining the top surface thereof which is inclined outwardly in the same direction as an associated recess 64.

Each fastening flange 53 of this exemplary embodiment of the invention has a cooperating inclined cam surface 81 defining the terminal lower end portion thereof. Each cooperating cam surface 81 is inclined from the bottom planar bearing surface 55 of its associated fastening flange 53 upwardly toward the center portion of its channel member 24. The cam surfaces 81 cooperate with cam surfaces 80 of an associated set 62 of the fastening legs 63 to enable simple and easy installation of the channel members 24 in position against an associated connector clip in a manner as will now be described.

Figure 8:
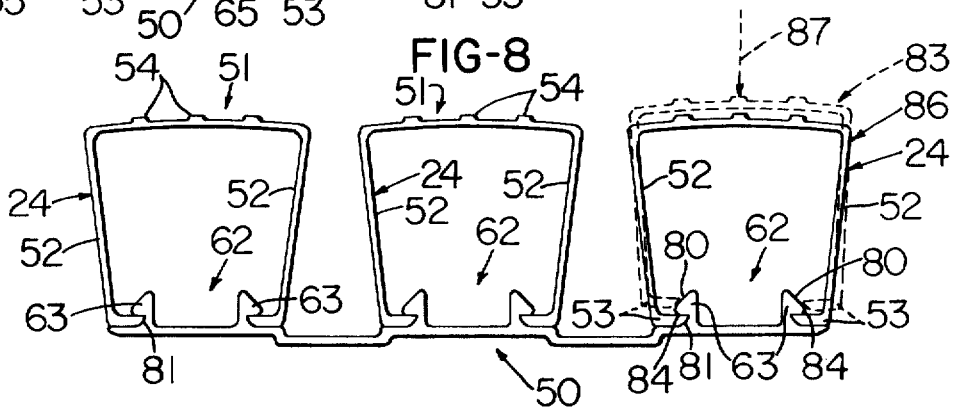
FIG. 8 is an end view of a plurality of three channel members similar to the channel members presented in FIGS. 4–6, illustrating a connector clip which is adapted to support all three of the channel members, and particularly illustrating by dotted lines the manner in which each channel member may be snapped in position against associated fastening legs of its connector clip merely by urging the channel member tightly toward and against such connector clip.

To highlight the simplicity with which each channel member 24 may be installed in position against an associated connector clip, reference is now made to FIG. 8. The connector clip illustrated in FIG. 8 has a plurality of three sets 62 of fastening legs rather than two sets as illustrated in FIGS. 4–6 of the drawings. In addition, the specific configuration of the channel member 24 provided in FIG. 8 is scaled down slightly from the configuration presented in FIGS. 4–6. Also, it will be noted that instead of providing five projections 54 extending upwardly from the load-carrying surface 51 a plurality of only three projections 54 are illustrated in the example of FIG. 8. Except for the detailed dimensions and the major differences pointed out above the channel members 24 of FIG. 8 are substantially identical to the channel members presented in FIGS. 4–6 and therefore component portions thereof will be designated by the same reference numerals as previously. Similarly, component portions of the associated connector clip 50 illustrated in FIG. 8 will also be designated by the same reference numeral as the connector clips illustrated in FIGS. 4–6.

FIG. 8 highlights the manner in which the cooperating inclined cam surfaces 81 on a given member 24 may be urged against cooperating cam surfaces 80 on a clip 50 to enable installation of each channel member 24 with optimum simplicity. In particular, reference is made to the right-hand portion of the illustration of FIG. 8 wherein a channel member 24 is shown in a raised position indicated by dotted lines at 83. The channel member 24 is easily fastened in position by urging, i.e. relatively moving, the cooperating cam surfaces 81 of the fastening flanges 53 against the cam surfaces 80 causing the lower ends of the side walls 52 to be spread apart by the action of the cam surfaces 80 and 81 whereupon once the fastening flanges 53 clear the lower edges 84 of the cam surfaces 80 the normal resiliency of the channel member 24 causes the fastening flanges 53 to snap to their original positions, beneath the associated fastening legs 63, and within the recesses 64 to clamp and firmly hold the associated channel member 24 in position.

The relative movement of a particular channel member 24 from a dotted line position as illustrated at 83 to the solid line position as illustrated at 86 may be achieved in any suitable manner. One technique which has been found particularly effective is to support each connector clip 50 in position on an associated support whereupon a member 24 to be fastened is positioned as shown by the dotted line position at 83. A suitable weight or force indicated by the arrow at 87 is applied against member 24 causing the spreading of the side walls 52 in the manner described and the snap fitting of the channel member 24 against an associated connector clip 50. The force indiated by the arrow at 87 may be applied merely by a man standing on a particular channel member or by striking such member with a hand or foot.

It will also be appreciated that the snap fitting action may also be provided by applying a force against the lower surface of the connector clip 50. In particular, it will be appreciated that a suitable tool may be utilized which has a hook-shaped lower end and such lower end may be hooked beneath an associated connector clip 50 to pull it upwardly against an associated channel member 24 to be installed while holding the associated channel member in position whereby the above described camming action provided by cam surfaces 80 and 81 would still take place in the manner described above.

As previously indicated, each connector clip 50 has a predetermined number of sets 62 of fastening legs provided thereon. In particular, it will be seen that the connector clip 50 illustrated in FIGS. 4–6 has two sets of fastening legs while the connector clip illustrated in FIG. 8 has three sets. Any desired number of sets 62 of fastening legs may be provided on a particular connector clip and the limiting factor would be the manufacturing technique utilized to make the particular connector clip.

The connector clips illustrated in FIGS. 4–6 and 8 of the drawings may be formed by an extrusion process and as shown in FIG. 9 for the particular type of connector clip illustrated in FIGS. 4–6. For this purpose a suitable die head 88 is provided which has a cooperating opening 89 provided therein which corresponds to and defines the cross-sectional configuration of an associated connector clip 50. An elongated section or strip of stock designated by the reference numeral 90 is extruded through the die head and the strip 90 is cut into sections having a comparatively narrow dimension as indicated at 103 in FIG. 4 to thereby define each connector clip 50.

In forming the connector clips 50 by an extrusion process the overall transverse dimensions, i.e. width corresponding to the dimension at 91, would be limited by practical considerations such as the maximum diameter of a die which may be economically produced. This suggests that where a large number of sets 62 of fastening legs are required on a particular connector clip, another technique should be utilized to provide such connector clip more economically and one exemplary technique for a very wide connector clip will be explained in connection with another exemplary embodiment of this invention which will be presented later in connection with FIG. 11 of the drawings.

Any desired plurality of channel members 24 may be fastened together utilizing the connector clips 50 to define an easily handled floor panel and for simplicity of presentation the two channel members 24 fastened together by their associated connector clips in FIGS. 4, 5 and 6 will in each instance be designated by the reference numeral 92 and each referred to as a panel 92. Thus, it will be appreciated that a particular floor construction 20 may have a plurality of panels 92 supported on associated supports such as the vertically arranged supporting walls 26 of the exemplary application of this invention illustrated in FIG. 1 and the floor construction 20 further comprises at least one connector clip 50 provided with at least two pairs or sets of fastening legs whereupon one set of the fastening legs 63 of such connector clip is fastened in position against a channel member of a first panel 92 and the other set of fastening legs is fastened against a channel member of a second panel 92 to thereby fasten the first and second panels together to comprise the particular floor construction 20.

For convenience and simplicity each panel 92 has been defined as being comprised of two channel members 24 in connection with the presentation of FIGS. 4, 5 and 6 and comprised of three channel members 24 in connection with the presentation of FIG. 8. However, as previously indicated, it will be appreciated that a panel 92 may have any desired width and may be of such a size that any desired number of channel members 24 may be provided thereon. For example, when utilizing the connector clips 50 which have only two sets 62 of fastening legs provided thereon it would be a simple matter to provide, for example, 4, 12, 24 or any other desired number of channel members to form a given panel of expanded size and wherein one or more connector clips 50 may be utilized to fasten together adjoining panels comprised of only two channel members to form the expanded size panel. With this technique the overall width of an expanded size panel would be controlled and determined by the weight thereof and the ease with which it could be handled.

The channel members 24 may be made in any suitable manner; however, one technique which has been used successfully to form channel members 24 by an extrusion process wherein an elongated strip of stock material 94 is extruded through an extrusion die head 95 as illustrated in FIG. 10. The elongated member 94 has a cross-sectional configuration defined by a corresponding die head 95 and such cross-sectional configuration of the member 94 corresponds to the cross-sectional configuration of an associated channel member 24. The member 94 is then cut to define members 24 having the desired length.

In the illustration of FIG. 10 the channel member 24 of FIGS. 4–6 is illustrated as being extruded through an associated die head 95. However, it will be appreciated that the same technique could be utilized to extrude the channel members illustrated in FIG. 8 using a similar die head.

In forming the channel members 24 from an associated piece of extruded elongated stock material 94 each channel member has its component portions formed as an integral unit. Similarly, each elongated member 90 which is used to define the connector clips 50 has its fastening legs and component portions defined as an integral unit whereby the members 24 and 50 have optimum strength and structural integrity.

Figure 11:
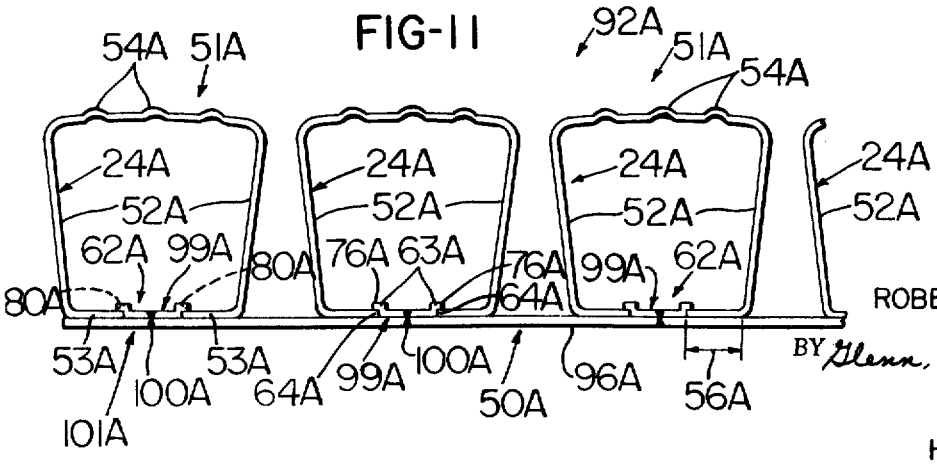
FIG. 11 is an end view similar to FIG. 8 and illustrating another exemplary embodiment of this invention wherein the channel members are formed by roll forming and fastened in position against an associated connector clip of extended length.

Another exemplary embodiment of this invention is illustrated in FIG. 11 of the drawings and is presented in the form of a panel defined by a plurality of channel members suitably fastened together by a connector clip at each end thereof. The floor panel of FIG. 11 is substantially very similar to the floor panels 92 illustrated in FIGS. 4–6 and 8 of the drawings; therefore, such panel will be designated generally by the reference numeral 92A. In addition, the channel members and connector clips comprising the floor panel 92A are very similar to the channel members 24 and connector clips 50 previously described and therefore such channel members and connector clips will be designated generally by the reference numerals 24A and 50A respectively and component portions of each member which are very similar to corresponding component portions of the channel members 24 and connector clips 50 previously described will be designated by the same numeral as previously also followed by the letter designation A and not described again. Only those component parts of members 24A and 50A which are substantially different from corresponding parts of channel members 24 and associated connector clips 50 respectively will be designated by new numerals also followed by the letter designation A and described in detail.

The channel members 24A illustrated in FIG. 11 are preferably defined by roll forming and accordingly each of the projections 54A provided in the load-carrying surface 51 thereof has a rounded outwardly convex configuration. The downwardly extending side walls 52A terminate in inwardly directed fastening flanges 53A and in this illustration it will be seen that the inwardly directed fastening flanges 53A have substantially vertically arranged edges provided thereon, however, it will be appreciated that an inclined surface similar to the cam surface 81 could also be provided at the terminal lower edge of the fastening flanges 53A by suitably ironing such flanges using associated forming rolls.

The main difference between the panel 92A illustrated in FIG. 11 and panel 92 is in the connector clips 50A comprising the panel 92A. Each connector clip 50A has a base portion 96A formed as a separate substantially planar strip and the fastening legs 63A are provided as separate units and suitably fixed to the strip 96A at predetermined intervals to provide the same function as the legs 63 which were formed integrally in the connector clip 50. Each fastening leg 63A may be separately attached to the base strip 96A as by welding, bolting, or the like. However, in this exemplary embodiment of the invention each set 62A of fastening legs 63A is provided as one piece or unit designated generally by the numeral 99A which is suitably fastened as by welding and as indicated at 100A so that each set 62A of legs 63A for a particular channel member 24A is simultaneously fastened in position against the base strip 96A.

Each unit 99A has a central portion which has a roughly U-shaped configuration and is provided with a pair of horizontal legs 76A which extend in opposite directions from the vertically arranged legs of the U-shaped central portion. An outwardly facing recess 64A is defined beneath each horizontal leg 76A. Each unit 99A may be made by suitably forming a flat strip of elongated material; and, if desired it would be a simple matter to provide an inclined cam surface 80A adjoining the terminal end of each leg 76 and extending upwardly similar to the cam surface 80. The cam surface 80A would be an optional configuration and is thus shown by dotted lines as part of one set 62A of fastening legs and as shown at 101A in FIG. 11. Each cam surface 80A would serve the same function and enable easy installation of an associated channel member 24A essentially in the same manner as illustrated for a channel member 24 in the right hand portion of FIG. 8.

With the construction illustrated in FIG. 11, the base portion 96A may be made of any desired length, such as 4 feet long, for example, and the channels 24A may be made of 8 foot lengths whereupon the panels 92A would be of a standard 4 ft. × 8 ft. These panels could be easily installed in position by one man because the weight of such a panel formed of metal containing aluminum would be comparatively light.

In this example of the invention it will be seen that the width of a fastening flange 53A indicated at 56A is wider than the width 56 of an associated fastening flange 53 and provides an even larger bearing surface for the associated channel member 24A.

The channel members 24A may also be fastened in position against their associated fastening clips 50A utilizing the installation tool 66. In those applications where an inclined cam surface 80A is provided on each fastening leg 63A the installation may be achieved as illustrated in FIG. 8 of the drawings by urging the particular channel member 24A against the associated fastening legs 63A of an associated clip 50A causing the lower ends of the downwardly extending side walls 52A to spread and snap in position against such clip.

In those applications wherein floor panels 92A are utilized and comprise a comparatively large floor area it is a simple matter to attach adjoining panel members 92A together merely by providing connector clips 50A which have a plurality of only two sets 62A of fastening legs which can be fastened in position against an outer channel member 24A of one panel and the other set 62A of connector leg 63A may be fastened in position against the outer channel member 24A of an adjacent panel 92A. Likewise, it may be possible with the construction illustrated in FIG. 11 to provide clips 50A of comparatively long lengths with the sets 62A of fastening legs 63A suitably fastened in position at the predetermined desired interval. Once it is desired to utilize a particular connector clip 50A of a given length it is merely necessary to cut the elongated clip 50A to the desired length to form individual panels 92A and to form interconnecting clips for connecting adjoining panels and wherein each interconnecting clip may only have two pairs or sets 62A of fastening legs 63A.

As seen in FIG. 4 of the drawings each connector clip 50 has a comparatively narrow width 103 and this width may be varied to suit the particular installation requirements. Thus, upon cutting the elongated strip 90 after it is extruded through the die head 88 it is a simple matter to cut such elongated strip 90 to any desired width. Similarly, it will be appreciated that the base portion 96A of the connector clip 50A can likewise be made of any suitable predetermined width. Also, each unit 99A which defines a set of fastening legs 63A may be of the same width as the width of base portion 96A or of a different width.

Usually, the connector clips 50 or 50A will be installed in position adjacent opposite ends of their respective channel members 24 and 24A respectively. Where it is desired to tie together a pair of panels 92 and 92A in the manner previously described, it will be appreciated that the particular connector clip 50 or 50A which ties the panels together will be offset or staggered (as seen at 105 in FIG. 4 for panels 92) from the usual rectilinear arrangement of the connector clips provided in a particular floor construction.

It will also be appreciated that each connector clip, 50 or 50A, utilized to tie together individual channel members or adjacent panels may be axially slid along the length of its associated channels until the desired position is reached. For this purpose, an elongated instrument with a hooking lower end may be provided to reach through the downwardly flaring passage between adjacent members to engage and pull a particular connector clip to the desired position.

In the previous detailed description made in connection with FIGS. 5 and 6 of the drawings an installation tool 66 was utilized at the end of an associated channel member 24 to spread apart its side walls 52 and hence its fastening flanges 53 to enable simple installation against an associated connector clip 50. However, it will be appreciated that the installation tool 66, or a similar tool, may be utilized in the manner illustrated in FIGS. 12–14 to provide simple installation of associated channel members against associated connector clips.

The structural members shown in FIGS. 12–14 and the installation tool 66 are identical to corresponding members shown in FIGS. 5 and 6 of the drawings; therefore, such members will be given identical reference numerals as previously and the detailed description now to be presented will be concerned solely with the alternate manner of utilizing the installation tool 66 and as presented in FIGS. 12–14 of the drawings. In particular, it will be seen that the installation tool is placed in position so that its head portion 70 is received within the opening provided between the fastening flanges 53 of an associated channel member and as shown by dotted lines in FIG. 12.

Figure 12:
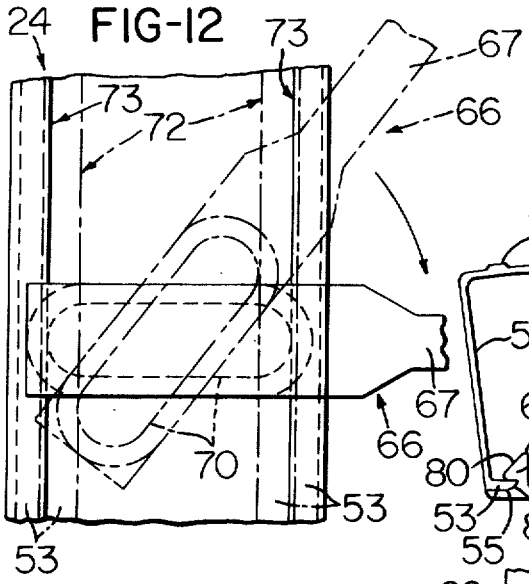
FIG. 12 is a view looking upwardly toward the bottom of a channel member of FIG. 4 and particularly illustrating the manner in which an installation tool may be utilized to spread apart the fastening flanges of such channel member and enable easy installation against associated fastening legs of a connector clip.
Figure 13:
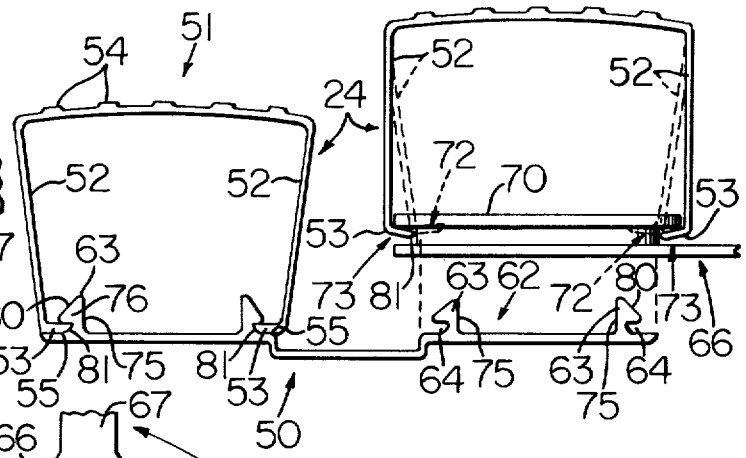
FIG. 13 is an end view similar to FIG. 5 and particularly illustrating the fastening tool being utilized to spread apart the fastening flanges in the manner presented in FIG. 12.
Figure 14:
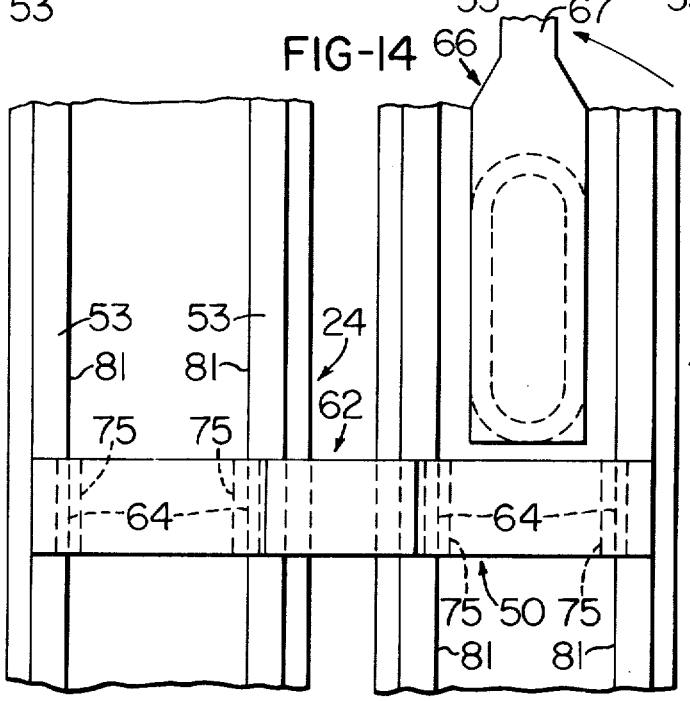
FIG. 14 is a view looking upwardly at the pair of channel members shown in FIG. 13 and showing the fastening flanges fastened in position against an associated connector clip and showing the installation tool prior to withdrawal thereof.

The handle portion 67 of the installation tool 66 may then be rotated in either direction, shown as being rotated clockwise in FIG. 12, whereby the fastening flanges 53 are spread from the dotted line position indicated at 72 to the solid line position indicated at 73 in FIGS. 12 and 13.

The channel member 124 and its associated connector clip 50 are relatively moved together in a similar manner as described in connection with FIGS. 5 and 6 and so that each fastening flange 53 is aligned opposite an associated recess 64 provided in connector clip 50. The installation tool 66 is then returned to its initial position, which is a dotted line position of FIG. 12, and the normal resiliency of the channel member 24 causes its side walls 52 to return to their initial positions whereby the fastening flanges 53 are received within the associated recesses 64 and the channel 24 is supported solely by the fastening flanges 53 at its lower end engaging the connector clip 50.

With the technique of utilizing the installation tool 66 in the manner illustrated and described in connection with FIGS. 12–14 it will be appreciated that it would be a simple manner to position the iinstallation tool at any desired position along the length of the associated channel member of comparatively long length and preferably at a location adjacent the position where a connector clip is desired to be installed in position to enable easier installation of each connector clip.

Figure 15:
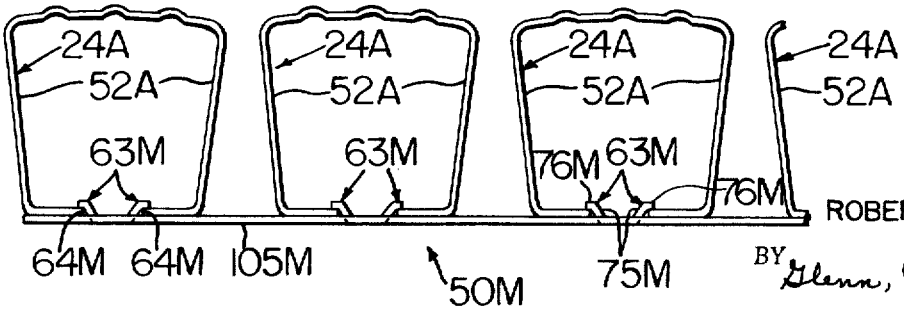
FIG. 15 is a view similar to FIG. 11 and illustrating channel members substantially identical to the channel members of FIG. 11 fastened in position against another exemplary embodiment of an associated connector clip which is also of extended length.

Another exemplary embodiment of this invention is illustrated in FIG. 15 of the drawings and is presented in the form of a panel which is very similar to the panel 92A illustrated in FIG. 11; therefore, the panel of FIG. 15 will be designated generally by the reference numeral 92M. The channel members of the panel 92M are identical to the channel members of FIG. 11; therefore, such channel members will be designated by the reference numeral 24A as previously and their component portions will also be designated by the same corresponding reference numerals as previously and not described again in detail.

The only difference between the panel 92M and the panel 92A is in the connector clip utilized therein. However, the connector clip of FIG. 15 has portions which are very similar to corresponding portions of the connector clips 50 and 50A; therefore, the connector clip of FIG. 15 will be designated generally by the reference numeral 50M and such similar portions will be designated by the same reference numeral as previously followed by the letter designation M and not described again in detail. Only those portions of clip 50M which are substantially diferent from corresponding portions of clips 50 or 50A will be designated by a new reference numeral also followed by the letter designation M and described in more detail.

Each connector clip 50M may also be made in long lengths and has a base portion 105M and roughly L-shaped fastening legs 63M which may be provided in the strip 105M using suitable punching and forming means. For example, the strip 105 may be lanced or pierced and associated dies, or the like, utilized to form the desired configuration of each fastening leg 63M. Each connector clip 50M is in essence comprised of an elongated flat strip of metal having high structural strength and each fastening leg 63M may be integrally formed so that a laterally outwardly open recess 64M is formed therein and is adapted to receive an associated fastening flange of an associated channel member therewithin in a similar manner as previously described in detail.

Figure 16:
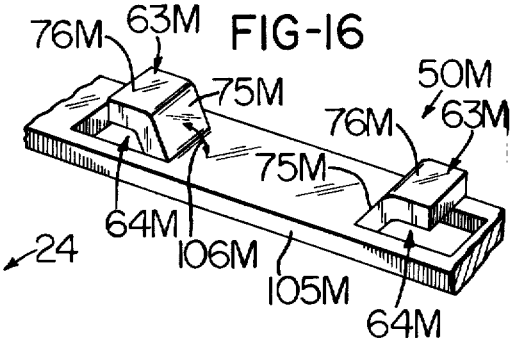
FIG. 16 is a fragmentary perspective view particularly illustrating the integral fastening legs of the connector clip illustrated in FIG. 15.

As will be apparent from FIG. 16 each roughly L-shaped fastening leg 63M is defined by an integral horizontally extending leg portion 76M and a substantially vertically extending leg portion 75M. The leg portion 75M in this example of the invention is shown as being arranged at an angle indicated at 106M with respect to the base portion 105M of its connector clip 50M.

The single piece connector clip 50M has all of the advantages of the extended length connector clip 50A made of a plurality of parts and previously described in connection with the panel 92A; thus, such advantages will not be repeated. Further, it will be appreciated that the cost of making the connector clip 50M will be less than the cost of making the connector clip 50A.

Figure 17:
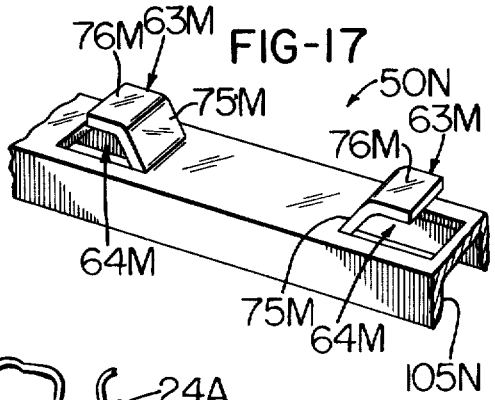
FIG. 17 is a fragmentary perspective view similar to FIG. 16 and illustrating another exemplary embodiment of a connnector clip of extended length wherein the base portion of such connector clip has an inverted substantially U-shaped cross-sectional configuration.

Another exemplary embodiment of a connector clip is illustrated in FIG. 17 of the drawings and the connector clip of FIG. 17 is substantially identical to the connector clip 50M with the exception of the elongated base portion thereof. Therefore, the connector clip of FIG. 17 will be designated generally by the reference numeral 50N. The connector clip of FIG. 17 instead of having an elongated flat strip defining its base portion has a channel-shaped strip defining its base portion and in this example such channel-shaped strip is in the form of an inverted U-shaped portion which is designated by the reference numeral 105N.

The remainder of the component portions of the connector clip 50N are identical to corresponding portions of connector clip 50M. Therefore, such identical component portions will be designated by the identical reference characters used in the clip 50M and not described again. The connector clip 50N may also be made of extended length and has all of the previously described advantages of the connector clips 50A and 50M while providing optimum structural strength for the panels made using clip 50N due to the channel-shaped configuration of its base portion 105N.

Having presented the detailed construction and arrangement of the individual channel members and associated connector clips in the above exemplary embodiments of this invention, it will be appreciated that a particular floor construction (as shown in FIG. 4, for example may be defined in a simple manner by arranging a plurality of U-shaped channel members 24 in parallel spaced relation and in inverted position so that each load-carrying surface 51 is arranged in a substantially horizontal plane and the members 24 are supported on associated connector clips 50. The channel members 24 are then fastened together by fastening each channel member to its associated connector clips 50 and each clip 50 has a base portion and sets 62 of upwardly and outwardly extending fastening legs 63.

The fastening action may be achieved by spreading the lower ends of the side walls 52 of a channel member 24 outwardly at a location adjacent an associated set of fastening legs 63 and then relatively moving the associated channel 24 and connector clip 50 together. Upon releasing the outwardly spread downwardly converging side walls 52 the normal resiliency of the channel member 24 allows the side walls 52 to return to their normal initial position with the fastening flanges 53 being received within an associated set of recesses 64 defined by the fastening legs 63 so that the associated channel member 24 is supported solely by the fastening flanges 53 at its lower end engaging the fastening or connector clips 50.

The channel members may be interconnected to define the various floor panels 92, 92A, and 92M and the channel members may have their end portions supported on associated supports such as supporting ledges 25, 35, and 42 of vertical walls 26, 36, and 43 respectively and as presented in FIGS. 1, 2 and 3 of the drawings.

The floor panels 92, 92A, and 92M may be comprised of any desired number of associated channel members and adjoining floor panels need not be interconnected except in those applications where the weight supported by each floor construction would require such interconnection. Also, if desired, the channel members 24 and 24A may be connected to their supporting ledges in any suitable manner.

As previously explained, the fastening action may also be achieved by placing each connector clip 50 against an associated supporting ledge, for example, and forcibly urging the channel member 24 against the connector clip 50 as by stepping on the load-carrying surface thereof whereupon the fastening flanges 53 have their cam surfaces 81 cammed along cooperating cam surfaces 80 of the fastening legs 63 to provide the previously described snap-fitting action.

As previously mentioned, the floor constructions 21, 31, and 41, illustrated in FIGS. 1, 2, and 3 respectively of the drawings are particularly adapted for indoor raising of swine. To provide floor constructions 20 having optimum strength, durability, and lightweight, various aluminum alloys may be effectively utilized to provide connector clips and channel members by the extrusion, roll forming, punching, and similar processes.

In raising animals in confinement, different size channels and different spacing between channels is provided as determined by the weight of each particular animal supported on a given floor construction. In general, it can be stated that the width of the spacing between channel members and the structural strength of such members increases in diect proportion to the weight of each animal.

For example, in the raising of swine in confinement channel members having an overall height of 2.718 inches, a width across each load-carrying surface of 3.00 inches, a wall thickness of .062 inch with a distance of ⅜ inch to ½ inch between the top surfaces of the channel members is generally satisfactory for raising swine from the baby pig stage to 50 pounds. Channel members of approximately the same size are used for swine ranging from 50 pounds to 125 pounds. However, for these larger swine the distance between the top surfaces of immediately adjacent channel members ranges from ⅝ inch to 1 inch.

The larger channel members 24 illustrated in FIGS. 4, 5 and 6 of the drawings may be used for brood sows or market size pigs and the distance between the top surfaces of immediately adjacent members 24 ranges from ¾ inch to 1 inch. In each of these larger channel members the width across the load-carrying surface is 4.00 inches, the overall height is 2.968 inches, and the wall thickness is .078 inch.

The unique floor construction of this invention lends itself to defining floors of practically any size and such floors may be suitably supported in any suitable manner. Further, it will be appreciated that it is a simple matter to replace a defective or damaged channel member 24 or 24A without removing the entire floor or an entire panel or for that matter without necessity of evacuating the associated building of animals. For example, it would be a simple matter to insert an appropriate tool downwardly through a diverging channel 65 and spread apart the side walls of a particular damaged channel member which is to be replaced enabling such damaged member to be moved away from the fastening legs of an associated clip 50. The procedure could be carried out in reverse to install a new member in place of the damaged member.

As previously mentioned channel members made of aluminum alloys may be effectively utilized in defining a floor construction as taught by this invention. Also, aluminum alloy members are very easy to flush clean allowing wastes, litter, and the like to drop through the floor construction into a pit arranged therebeneath. The pit may be of a flow-through variety and may be suitably inclined for easy flushing with water to prevent and reduce the likelihood of disease.

While present exemplary embodiments of this invention, and methods of practicing the same, have been illustrated and described, it will be recognized that this invention may be otherwise variously embodied and practiced within the scope of the following claims.

I claim:

[1. A floor construction for an animal enclosure comprising, a plurality of inverted substantially U-shaped channel members arranged in parallel spaced relation, each channel member having a bight defining a load-carrying surface and a pair of downwardly extending side walls terminating in inwardly directed fastening flanges, a plurality of connector clips fastening said channel members together, each connector clip having a base portion and sets of upwardly and outwardly extending fastening legs, each leg defining a laterally outwardly open recess which receives an associated fastening flange therewithin, and each given channel member having resilient means providing a normal resiliency therefor and holding its fastening flanges embraced within an associated set of recesses defined by the associated fastening legs and in grasping contact against the associated fastening legs so that each given channel member is fastened in position and supported by the fastening flanges at its lower end engaging said connector clips.]

2. A floor construction as set forth in claim [1] 6 in which each of said fastening flanges has a substantially planar bearing surface arranged roughly parallel to said load-carrying surface, and the bearing surfaces on said fastening flanges assuring that each channel member is capable of carrying a comparatively large load.

[3. A floor construction as set forth in claim 1 in which said channel members are of substantially identical construction and the spacing between channel members is substantially less than the width of each load-carrying surface.]

4. A floor construction as set forth in claim [1] 6 in which each of said channel members has a plurality of projections extending from the top of its load-carrying surface, said projections assuring animals may be easily supported on said load-carrying surface in a non-skidding manner.

5. A floor construction as set forth in claim [1] 6 in which each of said connector clips has a predetermined number of sets of fastening legs and upon fastening a corresponding predetermined number of channel members thereagainst an easily handled floor panel is thus defined, said floor construction having a plurality of panels thus defined supported alongside each other, and further comprising at least one connector clip having at least a pair of sets of fastening legs provided thereon said one connector clip having one of said pair of sets of fastening legs fastened against a channel member of a first panel and the other of said pair of sets of fastening legs fastened against a channel member of a second panel to thereby fasten said first and second panels together to comprise said floor construction.

6. A floor construction [ as set forth in claim 3] *for an animal enclosure comprising, a plurality of inverted substantially U-shaped channel members arranged in parallel spaced relation, each channel member having a bight defining a load-carrying surface and a pair of downwardly extending side walls terminating in inwardly directed fastening flanges, a plurality of connector clips fastening said channel members together, each connector clip having a base portion and sets of upwardly and outwardly extending fastening legs, each leg defining a laterally outwardly open recess which receives an associated fastening flange therewithin, and each given channel member having resilient means providing a normal resiliency therefor and holding its fastening flanges embraced within an associated set of recesses defined by the associated fastening legs and in grasping contact against the associated fastening legs so that each given channel member is fastened in position and supported by the fastening flanges at its lower end engaging said connector clips; in which floor construction said channel members are of substantially identical construction and the spacing between channel members is substantially less than the width of each load-carrying surface, and* in which each of said channel members has its downwardly extending side walls arranged in a converging manner so as to define a downwardly diverging passage between each immediately adjacent pair of channel members, each passage enabling animal wastes to be easily conveyed downwardly therethrough to provide a floor construction having optimum cleanliness.

7. A floor construction as set forth in claim [1] 6 in which each of said fastening legs is roughly L-shaped having a vertically extending leg portion and a horizontally outwardly extending leg portion cooperating to define an associated recess and further comprising an inclined cam surface defining the top surface of said horizontally extending leg said cam surface being inclined outwardly in the same direction as an associated recess, and each of said given channel members being easily installed in position against an associated connector clip merely by urging its fastening flanges against cam surfaces of associated fastening legs causing the lower ends of its side walls to be spread apart by the action of said cam surfaces and said normal resiliency causes the fastening flanges to snap beneath the associated fastening legs upon clearing the lower ends of the cam surfaces.

8. A floor construction as set forth in claim 7 and further comprising a cooperating inclined cam surface defining the terminal lower end portion of each fastening flange, each cooperating cam surface being inclined from the bottom surface of its associated fastening flange upwardly toward the center of its channel member.

9. A floor construction as set forth in claim 6 in which each of said connector clips has its base portion and its fastening legs formed as one integral part by an extrusion process.

10. A floor construction as set forth in claim 6 in which each of said connector clips has a base portion of extended length, having said sets of said fastening legs extending upwardly therefrom at predetermined intervals and formed as an integral part of said base portion by punching and forming means.

11. A floor construction as set forth in claim 6 in which each of said connector clips has its base portion formed as a separate elongated strip and said fastening legs are formed separately and fixed to said strip at predetermined intervals, each set of fastening legs for a channel member being provided as a single unit having a substantially U-shaped configuration and a pair of horizontal legs extending from vertically arranged legs of said unit so that each horizontally arranged leg defines an associated one of said recesses therebeneath, and each U-shaped unit being fixed to said elongated strip by fixing the bight thereof against said elongated strip.

12. A method of making a floor construction for an animal enclosure comprising the steps of, arranging a plurality of substantially U-shaped channel members in parallel spaced relation and in an inverted position, each channel member having a bight defining a load-carrying surface and a pair of downwardly extending side walls terminating in inwardly directed fastening flanges, fastening said channel members together by fastening each immediately adjacent pair of channel members to associated connector clips, each clip having a base portion and sets of upwardly and outwardly extending legs with each leg defining a laterally outwardly open recess adapted to receive an associated fastening flange therewithin, said fastening step comrpising the steps of spreading the lower ends of the side walls of an associated channel member at a location adjacent a set of fastening legs, relatively moving the associated channel member and associated connector clip together, and allowing the normal resiliency of the associated channel member to return its side walls to their initial positions with its fastening flanges being received within the associated set of recesses defined by the fastening legs so that the associated channel member is supported by the fastening flanges at its lower end engaging each connector clip, and supporting said plurality of channel members as fastened together by said connector clips on associated supports to define said floor construction.

13. A method as set forth in claim 12 in which said fastening step comprises fastening a predetermined number of said channel members together with a plurality of connector clips to define an easily handled floor panel and comprising the further steps of placing a plurality of said panels alongside each other on said supports to define said floor construction.

14. A method as set forth in claim 13 in which said clips are initially fastened in position adjacent opposite ends of each panel and comprising the further step of axially sliding a clip along its associated channel members to fasten the channel members together near the central portion of each panel.

15. A method as set forth in claim 13 in which each connector clip is made from an elongated section of stock material comprised of a base portion having sets of fastening legs extending upwardly therefrom at predetermined intervals, and comprising the further step of cutting said elongated section to define a clip having a predetermined number of sets of fastening legs and thus define the width of a particular panel.

16. A method as set forth in claim 13 and comprising the further steps of attaching said panels together with connector clips to provide said floor construction having greater structural stability and provide a predetermined spacing between adjacent panels.

17. A method as set forth in claim 12 in which said step of spreading the lower ends of the side walls of an associated channel member apart comprises spreading said lower ends apart with an associated tool.

18. A method as set forth in claim 12 in which each of said fastening legs of each connector clip is roughly L-shaped having a vertically extending leg portion and a horizontally outwardly extending portion cooperating to define an associated recess and each fastening leg further comprises an inclined cam surface defining the top surface of its horizontally extending leg portion said cam surface being inclined outwardly in the same direction as an associated recess, and said fastening step comprises placing each fastening flange against an associated cam surface and said step of relatively moving the associated channel member and connector clip together comprises forcefully urging said associated channel member and connector clip together causing the lower ends of the side walls of the associated channel member to be spread apart by the action of said cam surfaces and said normal resiliency of said associated channel member causing the fastening flanges to snap beneath the associated fastening legs upon clearing the lower ends of the cam surfaces.

19. A floor construction comprising, a plurality of inverted substantially U-shaped channel members arranged in parallel spaced relation, each channel member having a bight defining a load-carrying top surface and a pair of downwardly extending side walls arranged in a converging manner and terminating in inwardly directed fastening flanges, a plurality of connector clips fastening said channel members together, each connector clip having a base portion and sets of upwardly and outwardly extending fastening legs, each leg defining a laterally outwardly open recess which receives an associated fastening flange therewithin, each given channel member having resilient means providing a normal resiliency therefor and holding its fastening flanges embraced within an associated set of recesses defined by the associated fastening legs and in grasping contact against the associated fastening legs so that each given channel member is fastened in position and supported by the fastening flanges at its lower end engaging said connector clips, and said converging side walls of each channel member assuring that each immediately adjacent pair of channel members has a downwardly diverging passage defined therebetween by an associated set of side walls which assures easy drainage therethrough.

20. A floor construction as set forth in claim 19 in which each of said channel members has a plurality of integral projections extending from the top of its load-carrying surface and defining a substantially non-skid surface.

21. A floor construction as set forth in claim 19 and further comprising a cooperating inclined cam surface defining the terminal lower end portion of each fastening flange, each cooperating cam surface being inclined from the bottom surface of its associated fastening flange upwardly toward the center of its channel member.

22. A floor construction as set forth in claim 19 in which each of said fastening legs is roughly L-shaped having a vertically extending leg portion and a horizontally outwardly extending leg portion cooperating to define an associated recess and further comprising an inclined cam surface defining the top surface of said horizontally extending leg said cam surface being inclined outwardly in the same direction as an associated recess, and each of said given channel members being easily installed in position against an associated connector clip merely by urging its fastening flanges against cam surfaces of associated fastening legs causing the lower ends of its side walls to be spread apart by the action of said cam surfaces and said normal resiliency causes the fastening flanges to snap beneath the associated fastening legs upon clearing the lower ends of the cam surfaces.

23. An inverted substantially U-shaped channel member for use in a floor construction comprising, a bight defining a load-carrying surface, a pair of downwardly extending side walls, a pair of inwardly directed fastening flanges each extending inwardly toward the other from the lower edge of an associated side wall, each of said fastening flanges having a substantially planar bearing surface arranged roughly parallel to said load-carrying surface, said bearing surfaces being arranged substantially coplanar and having a sufficient area to assure said channel member is capable of carrying a comparatively large load, and an inclined cam surface defining the terminal lower end portion of each fastening flange, each cam surface being inclined from the bottom surface of its associated fastening flange upwardly toward the center of said channel member, said channel member being made of a resilient material with said inclined cam surfaces enabling said fastening flanges to be cammed outwardly and snapped firmly in position beneath associated fastening legs provided on a connector used to support said channel member.

24. A channel member as set forth in claim 23 in which said downwardly extending side walls are arranged in a downwardly converging manner.

25. A channel member as set forth in claim 23 made by extrusion process and having a plurality of integral projections extending from the top of its load-carrying surface and defining a substantially non-skid surface.

[ 26. An inverted substantially U-shaped channel member for use in a floor construction, said channel member comprising a bight defining a top load-carrying surface, a pair of downwardly extending side walls, a plurality of upstanding projections on said bight defining said load-carrying surface as a substantially non-skid surface, and a pair of inwardly directed fastening flanges each extending inwardly toward the other from the lower edge of an associated side wall, said channel member having a width between the lower edges of said side walls which is no greater than the width of said top load-carrying surface, said channel member being made of a resilient material which enables the lower ends of its side walls and hence its fastening flanges to be spread apart at a location adjacent a set of associated fastening legs provided on an associated connector clip used to connect said channel member to an associated structural member and upon releasing said side walls the normal resiliency of said channel member causes its side walls to return to their initial positions with the fastening flanges hooked around said fastening legs so that said channel member is fastened in position and supported in its upright position by the fastening flanges at its lower end engaging said connector clip.]

27. A [ channel member ] *floor construction* as set forth in claim [ 26 ] *20* in which said downwardly extending side walls are arranged in a downwardly converging manner, each of said fastening flanges has a substantially planar bearing surface arrangged roughly parallel to said load-carrying surface, and said bearing surfaces being arranged substantially coplanar and having a sufficient area to assure said channel [ member is ] *members are* capable of carrying a comparatively large load.

*28. A floor construction as set forth in claim 27 in which said grasping is exerted by said fastening flanges toward each other along the plane of said substantially planar bearing surface.*

*29. A floor construction as set forth in claim 28 which is for an animal enclosure and through whose said downwardly diverging passages animal wastes may be easily conveyed downwardly.*

*30. A floor construction as set forth in claim 11 in which said channel members are of substantially identical construction and the spacing between channel members is substantially less than the width of each load-carrying surface.*

* * * * *